United States Patent
Andersson et al.

(10) Patent No.: US 9,470,891 B2
(45) Date of Patent: *Oct. 18, 2016

(54) HEAD-UP DISPLAY FOR NIGHT VISION GOGGLES

(71) Applicant: SAAB AB, Linkoeping (SE)

(72) Inventors: Stefan Andersson, Habo (SE); Arnold Fredriksson, Huskvarna (SE); Johan Zanden, Norrahammar (SE)

(73) Assignee: SAAB AB, Linkoeping (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/894,096

(22) PCT Filed: Jun. 17, 2013

(86) PCT No.: PCT/SE2013/050705
§ 371 (c)(1),
(2) Date: Nov. 25, 2015

(87) PCT Pub. No.: WO2014/204361
PCT Pub. Date: Dec. 24, 2014

(65) Prior Publication Data
US 2016/0116736 A1    Apr. 28, 2016

(51) Int. Cl.
G02B 27/01 (2006.01)
G03B 21/20 (2006.01)
G03B 21/28 (2006.01)

(52) U.S. Cl.
CPC ......... *G02B 27/0101* (2013.01); *G03B 21/206* (2013.01); *G03B 21/2013* (2013.01); *G03B21/28* (2013.01); *G02B 2027/0112* (2013.01); *G02B 2027/0118* (2013.01); *G02B 2027/0138* (2013.01); *G02B 2027/0194* (2013.01)

(58) Field of Classification Search
CPC .......... G02B 27/0172; G02B 27/0101; G02B 27/1006; G02B 2027/0138; G02B 2027/0118; G02B 23/02; G02B 23/12; G02B 23/14; G02B 23/125; G03B 21/006; G03B 21/10
See application file for complete search history.

(56) References Cited

U.S. PATENT DOCUMENTS

| 4,997,263 A | 3/1991 | Cohen et al. |
| 5,483,307 A | 1/1996 | Anderson |

(Continued)

FOREIGN PATENT DOCUMENTS

| EP | 2093603 A1 | 8/2009 |
| EP | 2194418 A1 | 6/2010 |
| EP | 2199843 A1 | 6/2010 |
| EP | 1798587 B1 | 6/2012 |

OTHER PUBLICATIONS

The International Searching Authority, International Search Report and Written Opinion for Application No. PCT/SE2013/050705, Mar. 24, 2014, 10 pages, Swedish Patent and Registration Office, Sweden.

*Primary Examiner* — Sultan Chowdhury
(74) *Attorney, Agent, or Firm* — Alston & Bird LLP

(57) ABSTRACT

A head-up display system for facilitating the use of night vision goggles for a person in a vehicle during night vision conditions, the system comprising a light source for providing light to an image source arranged to project an image on a semi-transparent combiner mirror arranged to superimpose the projected image onto a view of the environment in front of the vehicle. The system also comprises a first and a second light source for alternatively providing light to the image source; the first light source being arranged to emit light of a first color in a first light emission spectrum, perceived as green, and to be used during daylight conditions, and the second light source being arranged to emit light of a second color in a second light emission spectrum, perceived as yellow or orange, and to be used during night vision conditions.

11 Claims, 4 Drawing Sheets

(56) References Cited

U.S. PATENT DOCUMENTS 6,359,737 B1 * 3/2002 Stringfellow ...... G02B 27/0101
  250/214 VT 2007/0218428 A1    9/2007 Taffet
2015/0338633 A1 * 11/2015 Li ..................... G02B 23/12
  250/226

* cited by examiner

HEAD-UP DISPLAY FOR NIGHT VISION GOGGLES

CROSS REFERENCE TO RELATED APPLICATIONS

This application is a National Stage Application, filed under 35 U.S.C. §371, of International Application No. PCT/SE2013/050705 filed Jun. 17, 2013, the contents of which as are hereby incorporated by reference in their entirety.

BACKGROUND

1. Related Field

The present invention relates to optical presentation devices for vehicles. More particularly it relates to devices for combining an observer's view in front of a vehicle with a synthetic image by superimposing the latter on the former, so called head-up displays. Even more particularly it relates to head-up displays suitable for use together with night vision goggles.

2. Description of Related Art

In fast moving vehicles, such as aircraft, it may constitute a risk during flight of the aircraft, each time a pilot of the aircraft has to split his visual attention between what is happening in front of the vehicle and what is happening inside the vehicle, in particular on a dashboard showing flight information. Pilots of aeroplanes and helicopters are therefore often helped by a device called head-up display.

In a vehicle equipped with a head up display system, an observer, which usually is the pilot, observes the outside world through a windscreen of the vehicle, and a semi-transparent combiner mirror of the head-up display arranged in his forward line of sight such that a light ray from a distant object passes through the windscreen and then through the semi-transparent combiner mirror before it reaches an eye of the observer. Image information, such as flight information symbols of an image source are reflected to the semi-transparent combiner mirror of the head up display, and appear for the observer to be superimposed on the perceived image of the outside world. This has the advantage that the observer does not have to shift his eyesight for gathering flight information. He also avoids having to refocus eyesight, since optical elements usually are arranged to provide a so called collimated image.

Head-up display systems are known for use in e.g. military fighter aircraft. These display systems present flight information using a certain colour, and the combiner mirror is provided with certain layers of optical coating to reflect light of that certain colour better than light of other colours. This also means that light of other colours are not reflected as much and therefore are transmitted better through the semi-transparent combiner mirror.

A different aspect of flying an aircraft is that during night vision conditions it is very hard to precisely manoeuvre the aircraft in relation to the environment, since the pilot has to rely on instrument readings instead of eyesight of the environment. It is therefore an advantage to use night vision goggles, i.e., goggles that amplify even very faint light captured by them such that it is possible for a pilot wearing the goggles to observe the ground and the environment in front of and around the vehicle in spite of the darkness.

A further aspect of flying such a vehicle is that it would be advantageous if the pilot, equipped with night vision goggles, also could take advantage of the benefits of a head up display. However, it is not straightforward to take a head-up display system and fit it into a vehicle whose pilot already uses a pair of night vision goggles, and expect it to work well. This have been realised by the inventors and will be further discussed below.

However, a main object of the present invention is to provide a head-up display system that can be fitted into an aircraft, and whose pilot already is equipped with a pair of night vision goggles.

BRIEF SUMMARY

The inventor has realised that a problem encountered when using night vision goggles together with a head up display system is that the light amplification tubes of the night vision goggles get saturated, "blinded" when the pilot look at the head-up display because of the flight information shown on the display is of a much higher intensity than the intensity of the light from the dark environment. Certain types of night vision goggles are provided with automatic gain control that automatically down-regulates the light amplification, such that the user does not get blinded. However, when doing that in this particular application, i.e., looking at the symbols of the head-up display, the view of the environment becomes correspondingly less amplified and therefore gets difficult or even impossible to observe.

An object of the present invention is therefore to provide a head-up display that can be used together with night vision goggles without the disadvantages mentioned above. Additionally, a further object is to provide a head up display suitable for fitting into existing aircraft such as non-military helicopters, and at the same time suitable to use together with low cost night vision goggles.

The inventor has thus devised a head-up display for use together with low cost night vision goggles during nocturnal missions. One of these low cost types is called NVIS class B night vision goggles which is a type most commonly used today.

Most of the present operational aircraft that are certified today for flight with NVG equipment have the cockpit modification and type of NVG goggles used specified in the airworthiness documentation. Thus, a change of the type of NVG goggles from Class B to Class C to see the green graphics in a HUD would disable the aircraft certification for NVG flight. Thus, one of the advantages of the solution of the present invention is that it ensures that the aircraft NVG certification is untouched and still valid.

The invention provides a head up display system that comprises two separate light sources for rendering imagery on the head up display. Imagery in this context may be for example one or more of: flight information symbols, video imagery, and graphics.

Thus, one advantage of the head up display system is that it works both during daylight vision conditions and night vision conditions without being forced to use expensive so called NVIS class C night vision goggles. More precisely, the head up display system works during night vision conditions together with NVIS class B goggles.

According to a first aspect there is provided:

A head-up display system suitable for a vehicle having a pilot or observer liable to use night vision goggles of NVIS class B for looking at the environment and simultaneously at symbols of the head-up display during night vision conditions, the head-up display system comprising:
  an image source,
  a semi-transparent combiner mirror,
  a first light source (12) and a second light source, the lights sources for providing light to the image source, which image source is arranged to project an image comprising symbols on the semi-transparent combiner mirror, the semi-transparent combiner mirror having a coating being arranged to superimpose the projected image onto a view of the environment in front of the vehicle by transmitting light rays from the environment and at the same time reflecting the projected image towards an intended position of the eyes of the observer, and wherein the two light sources are arranged for alternatively providing light to the image source; and wherein the first light source is arranged to emit light of a first light emission spectrum to be used during daylight conditions, and wherein the second light source is arranged to emit light of a second light emission spectrum to be used during night vision conditions, and wherein the second light emission spectrum corresponds to a light colour that is mainly yellow or mainly orange, and wherein the light emission spectrum of the second light source is arranged to be a spectrum having a wavelength of peak intensity in the range of 570-600 nanometres, and having a bandwidth that is limited, and wherein the coating of the semi-transparent combiner mirror is arranged to have a combiner coating reflection spectrum having a peak of reflection at a wavelength within the range of 510 to 540 nanometres corresponding to a maximum reflection of light waves from the first light source, and wherein the light emission spectrum of the first light source is arranged to be a spectrum having a wavelength of peak intensity in the range of 520-540 nanometres, and having a bandwidth that is limited, and wherein light from the second light source, when reaching the position of the pilot's night vision goggles or unaided eye, after having travelled from the second light source via the image source and via the semi-transparent combiner mirror, have a luminance that after intensification in night vision goggles class B matches the intensified luminance of light of 670-930 nanometre, wherein the coating of the semi-transparent combiner mirror is adjusted to the wavelength of the first light source, such that during daylight conditions light from the first light source are reflected efficiently to provide good contrast to a pilot's eye also without any vision aids, and wherein the coating of the semi-transparent combiner mirror is adjusted to the wavelength of the second light source, such that during night vision conditions light from the second light source are reflected to provide light of the emission spectrum of the second light source suitable to be intensified by night vision goggles of NVIS class B to produce an image of similar luminance as the image of the environment in light of 670-930 nanometre wavelength (red and infrared).

The head-up display system wherein the light emission spectrum of the first light source is of Gaussian shape or of approximately Gaussian shape.

The head-up display system wherein the light emission spectrum of the second light source is of Gaussian shape or of approximately Gaussian shape.

The head-up display system wherein the light emission spectrum of the first light source has a peak at or near 524 nanometres.

The head-up display system wherein the combiner coating reflection spectrum have a peak of reflection at or near 524 nanometres.

The head-up display system wherein a semi-transparent flat folding mirror is arranged between the intended position of the eyes of the observer and the semi-transparent combiner mirror for reflecting the image from the image source towards the semi-transparent combiner mirror.

The head-up display system wherein the semi-transparent combiner mirror is spherical or aspherical.

The head-up display system wherein the semi-transparent combiner mirror is spherical.

The head-up display system wherein the emission dominating wavelengths and the combiner mirror reflection spectrum have the principal appearance as depicted in FIG. 3, curve 301, curve 302 and curve CC.

The head-up display system wherein the combiner mirror reflection spectrum is of Gaussian shape or of approximately Gaussian shape.

According to a second aspect of the invention there is provided the use of the head-up display system of above together with night vision goggles of NVIS class B.

It should be emphasized that the term "comprises/comprising" when used in this specification is taken to specify the presence of stated features, integers, steps or components but does not preclude the presence or addition of one or more other features, elements, integers, steps, components or groups thereof Features that are described and/or illustrated with respect to one embodiment may be used in the same way or in a similar way in one or more other embodiments and/or in combination with or instead of the features of the other embodiments.

BRIEF DESCRIPTION OF THE FIGURES

Other features of the invention will be more apparent upon consideration of the following description and of the accompanying drawings, wherein.

DETAILED DESCRIPTION OF VARIOUS EMBODIMENTS

Figure 1:
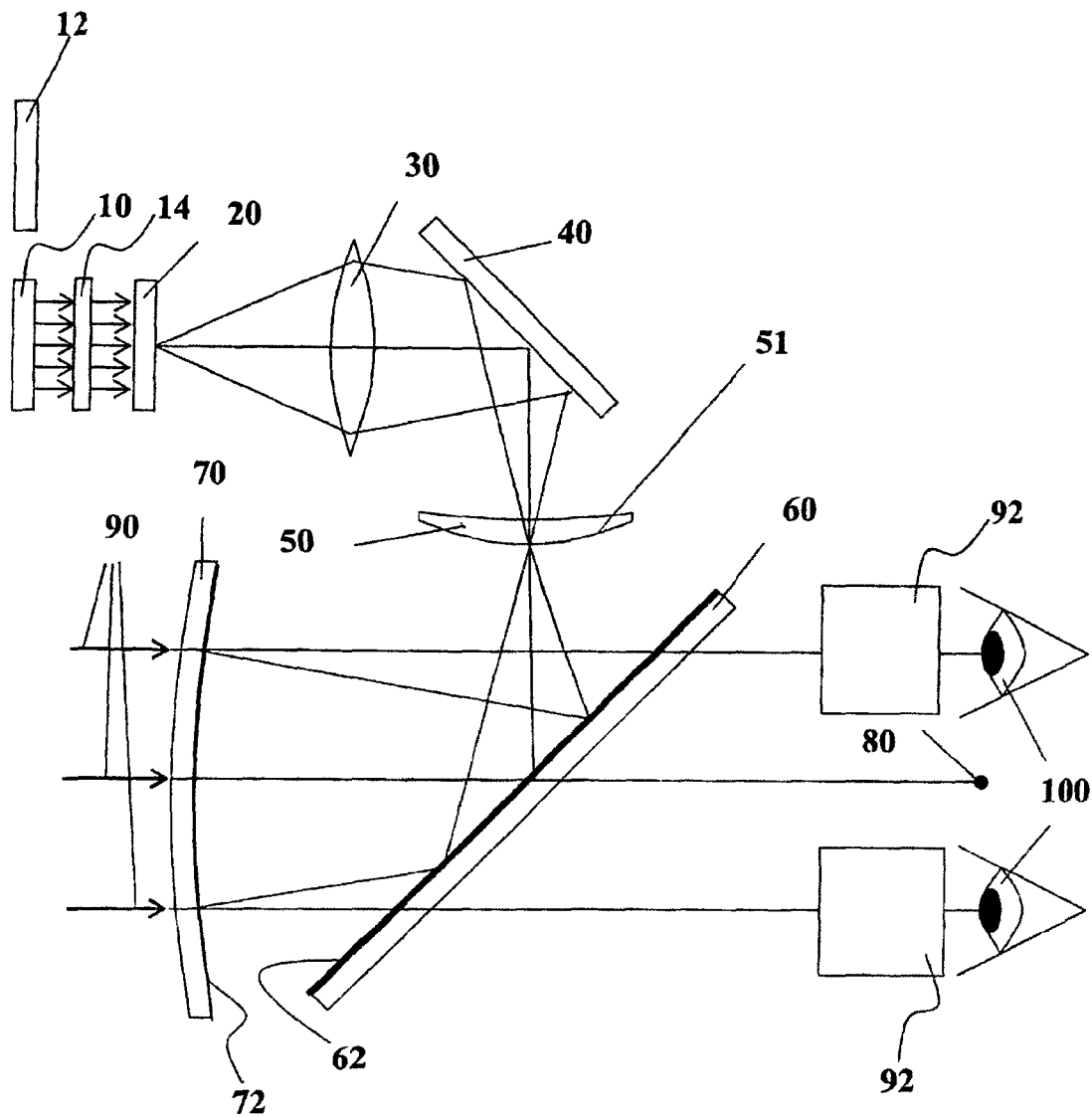
FIG. 1 shows a head-up display system for use together with night vision goggles during night vision conditions, the head-up display system being of a so called on-axis type.

FIG. 1 shows a head-up display system for a vehicle permitting an observer in the vehicle to use night vision goggles 92 during night vision conditions, the system comprising two light sources 10, 12 for providing light to an image source 20, which image source is arranged to project an image on a semi-transparent combiner mirror 70. The combiner mirror 70 being arranged to superimpose the projected 20 image onto a view of the environment in front of the vehicle by transmitting light rays 90 from the environment and at the same time reflecting the projected image towards an intended position of the eyes (100) of an observer wherein the two light sources are arranged for alternatively providing light to the image source. There is thus a first light source 12 able to emit light of a first light emission spectrum to be used during daylight conditions, and there is arranged a second light source 10 able to emit light of a second light emission spectrum to be used during night vision conditions, wherein the first light emission spectrum have a wavelength of maximum intensity between 520 and 540 nanometres resulting in a colour perceived as green and the second light emission spectrum having a wavelength of maximum intensity between 570 and 600 nanometres, and including colours perceived as yellow or orange. Both spectra being preferably of Gaussian or approximately Gaussian shape.

In more detail, there is provided a second light source of approximately 580 nanometre wavelength (yellow) with a bandwidth of about 18 nanometre, and corresponding dimming means such that light from this second light source, when reaching the pilots night vision goggles or unaided eye, after having travelled from the second light source via a semi-transparent combiner mirror 70, have a luminance that after intensification in night vision goggles class B matches the intensified luminance of light of 670-930 nanometre (red and infrared) wavelength from the environment.

The semi-transparent combiner mirror 70 is provided with a coating 72 that is adjusted to the wavelength of the first light source 12, such that during daylight conditions light from the first light source 12 is reflected by the semi-transparent combiner mirror 70 efficiently to provide good contrast to a pilot's eye also without any vision aids.

Head-up part

Many head-up displays either use a flat mirror or an off-axis spherical (or aspherical or holographic) mirror as a combiner to combine an image with the background.

In order to achieve high image quality and small outer dimensions, in one embodiment, a combiner is provided that comprises a spherical, or slightly aspherical, semi-transparent mirror 70 arranged relatively to a diffuser 50 such that a centre of an intermediate display image on said diffuser 50 comes on the optical axis (on-axis configuration) of the mirror 70. The optical axis is folded between the intermediate display image on the diffuser matt surface 51 and the collimating mirror 70 by a semi-transparent folding flat mirror 60. The collimated rays from the collimating mirror 70 and rays from the background 90 are transmitted through this semi-transparent mirror 60 to the eyes 100 or to a pair of night vision goggles 92. This means that some of the volume is passed twice or even three times by rays on their way from the display image to the eyes. This is a key feature for achieving small outer dimensions of the head up display system.

The folding flat mirror 60 is provided with a coating 62, and the semi-transparent collimating mirror 70 is provided with a coating 72. An image projected on the diffuser matt surface 51, is arranged in the focal plane of the collimating mirror 70. The diffuser lens 50 is arranged such that an image appears on one of its surfaces, preferably the surface closest to the flat mirror 60. That image is an intermediate image of the display surface 20. A projection lens 30 and a flat mirror 40 is used to project the intermediate image on the diffuser matt surface 51, the purpose of which is to spread the light from the image towards a sufficient large area of the collimating mirror 70 to allow for the pilot to move his head and still get collimated images of acceptable luminance to both eyes 100. This is equal to say that the exit aperture is widened.

The collimating mirror 70 is in a preferred embodiment spherical but could be slightly aspherical, to improve the image quality further. By placing the collimating mirror 70 and choosing its radius of curvature such that its centre of curvature becomes close to the intended position of a midpoint between the pilot's eyes 80, which is the centre of the exit aperture of the system, the quality of the collimated image will be high within a rather large eye position envelope and within a rather large field of view. For example, it is possible to achieve the image resolution and field of view needed with a radius of curvature of approximately 500 mm, which will allow the pilot to move his eyes within an area of at least 60×120 mm (up-down×sideways) without experiencing a noticeable decay in image quality.

To achieve the high quality collimated image, the diffuser matt surface 51 is arranged to be curved and the radius of curvature to be approximately half the (main) radius of curvature of the collimating mirror 70. The diffuser matt surface 51 may comprise a ground or sand blasted surface or a surface having a diffraction pattern or a holographic layer. The diffuser lens 50 is directing the light from the centre of the projection lens 30 towards the exit aperture centre 80, thereby acting as a field lens making the whole collimated image equally illuminated.

The semi-transparent collimating mirror 70 and the semi-transparent flat mirror 60 are preferably designed to reflect the main part of one (or a few) colour(s) while transmitting the main part of all other colours by applying alternative coatings 72 and 62 respectively.

Figure 4:
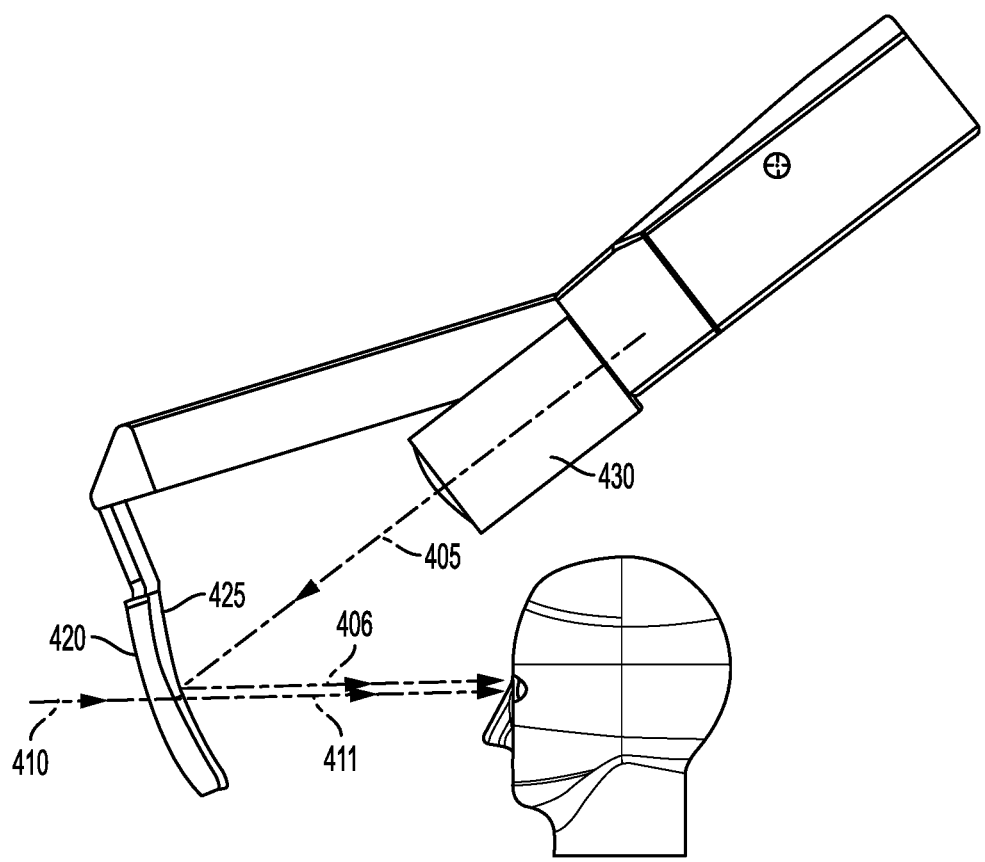
FIG. 4 shows a side view of head-up display system of a so called off-axis type

The present invention is applicable to both on-axis and off-axis configurations. FIG. 4 shows a side view of head-up display of the so called off-axis type. A combiner 420 with a combiner coating 425 combines environment light rays 410 from the outside environment with head-up symbol light rays 405 from an image generator/projector 430. Combined light rays 406, 411 reach the intended position of a pilot's eyes.

Now referring to FIG. 1, the head up display may further comprise a luminance control unit (not shown). The luminance of the background 90 is measured by a background luminance sensor (not shown) and the luminance of the intermediate image on the diffuser matt surface 51 is adjusted accordingly by adjusting the brightness of the image generating display 20 and/or the light source currently in operation 10, 12.

Also the diameter of an aperture stop in the projection lens 30 may be varied and/or a variable attenuation filter may be used. The light sources 10, 12 may be one or several light emitting diodes (LED), and the average brightness of the light sources 10, 12 may be controlled by the luminance control unit by pulsing the current, i.e. by applying different rations between on- and off-periods. Using the above arrangement, the image on the diffuser surface 51 becomes automatically adjusted in brightness such that it becomes clearly visible relative to the background, including bright sky or sunny snow. The brightness is also adjusted such that the pilot does not become blind or dazzled or otherwise influenced such that he becomes impaired in vision regarding e.g. his ability to perceive details on a runway during bad light conditions.

The system may include a unit for automatically switching from one light source to the other depending on ambient light conditions. The switching may as an alternative be accomplished manually.

Notation

By the notation "centred" and "centred wavelength", if used, is here understood the wavelength at which highest optical reflection of a mirror coating is achieved.

By the notation "dominating wavelength", if used, is here understood the wavelength at which highest emission of a light source is achieved.

The Invention and Military Standard 3009-(MIL-STD-3009)

According to MIL-STD-3009 of US Department of Defence (DoD), lighting and Night Vision Imaging Systems (NVIS) are divided into a number of classes. In the standard, a Night Vision Imaging system is defined as a system that uses image intensifier tubes to produce an enhanced image of a scene in light conditions too low for normal navigation and pilotage.

Figure 2:
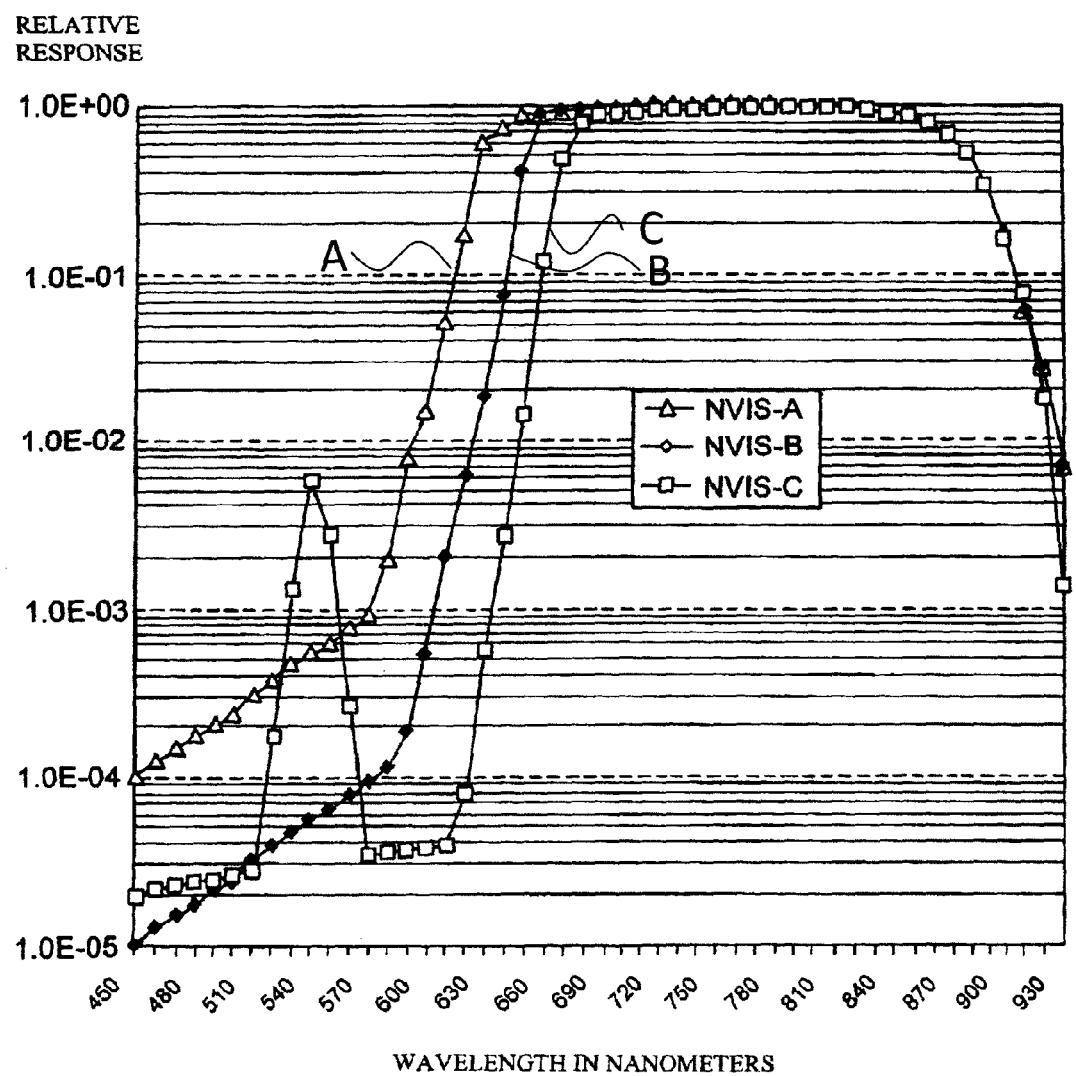
FIG. 2 shows a diagram of relative spectral response characteristics for night vision goggles of respectively class A, B and C NVIS (Night Vision Imaging System).

According to the standard, Class B NVIS is any NVIS with spectral response characteristics as shown by the curve B in FIG. 2.

Thus, an illumination unit 10,12,14 may comprise two types of light sources such as light emitting diodes (LEDs); a first type intended to be used during daylight conditions and a second type intended to be used during night vision conditions.

Example Spectrum Characteristics

Light Sources

The first type, the "daylight"lightsource/diode has a dominating wavelength of the emitted light of nominally 524 nanometres and a half intensity bandwidth of nominally 39 nanometres. A maximum luminous flux is specified to be 2100 lumen (lm).

The second type, the "nightlight" diode has a dominating wavelength of the emitted light in the range of nominally 580 to 590 nanometres and a half intensity bandwidth of nominally 18 nanometres. A maximum luminous flux for this diode is specified to be 60 lumen (lm).

One or more diodes of each type may be employed to help achieve enough intensity, in particular for the daylight conditions case.

Mirror(s)

The head-up system is provided with a semi-transparent combiner mirror 70, arranged in the field of view of the pilot and that combines light from the environment in front of the pilot with image information generated by an image generating devise using the light of the illumination unit with the diodes of above.

The combiner is provided with a coating 72. The coating reflectance spectrum of the combiner may advantageously be centred at nominally 524 nanometres and be provided with a half intensity bandwidth of nominally 35 nanometres of the reflection. The coating reflectance spectrum is preferably of Gaussian or approximately Gaussian shape.

The sum of the reflectance and the transmittance of the semi-transparent mirror coating is less than 100% at each wavelength and thus green light (around 524 nm) from the environment is reduced but the photopic transmission (the sum of the transmittance multiplied by the photopic weight-function for each wavelength) is still more than 70%, which is a requirement of a head-up display standard (AS 8055).

The head up display system works as follows: The coating of the combiner is adjusted to the wavelength of the daylight diode in the way mentioned above, i.e., light from the daylight diode is reflected at a high percentage and reaches the unaided eye of the pilot at intensity suitable to comfortably read the symbols discernable in the environmental light during daylight conditions.

When, on the other hand, the nightlight diode is used to render imagery on the head up display during night vision conditions, the coating 72 of the semi-transparent combiner mirror 70 is arranged to, as described above, only reflect enough light to meet NVIS class B standards and such that enough light, i.e., light of an intensity that makes symbols clearly visible to the pilot when using NVIS class B goggles, is reflected. The inventors have devised that it would maybe be possible to use the green daylight diode for this purpose but it has shown hard to achieve an acceptable level of the symbol luminance due to the limited dynamic range of that diode, see description of luminance control above.

By using a separate diode and a partly separate path of light it is possible to adjust the level of the symbol luminance to whatever needed to make symbols clearly visible to the pilot when using night vision goggles, and at the same time not disturb viewing of the environment.

Figure 3:
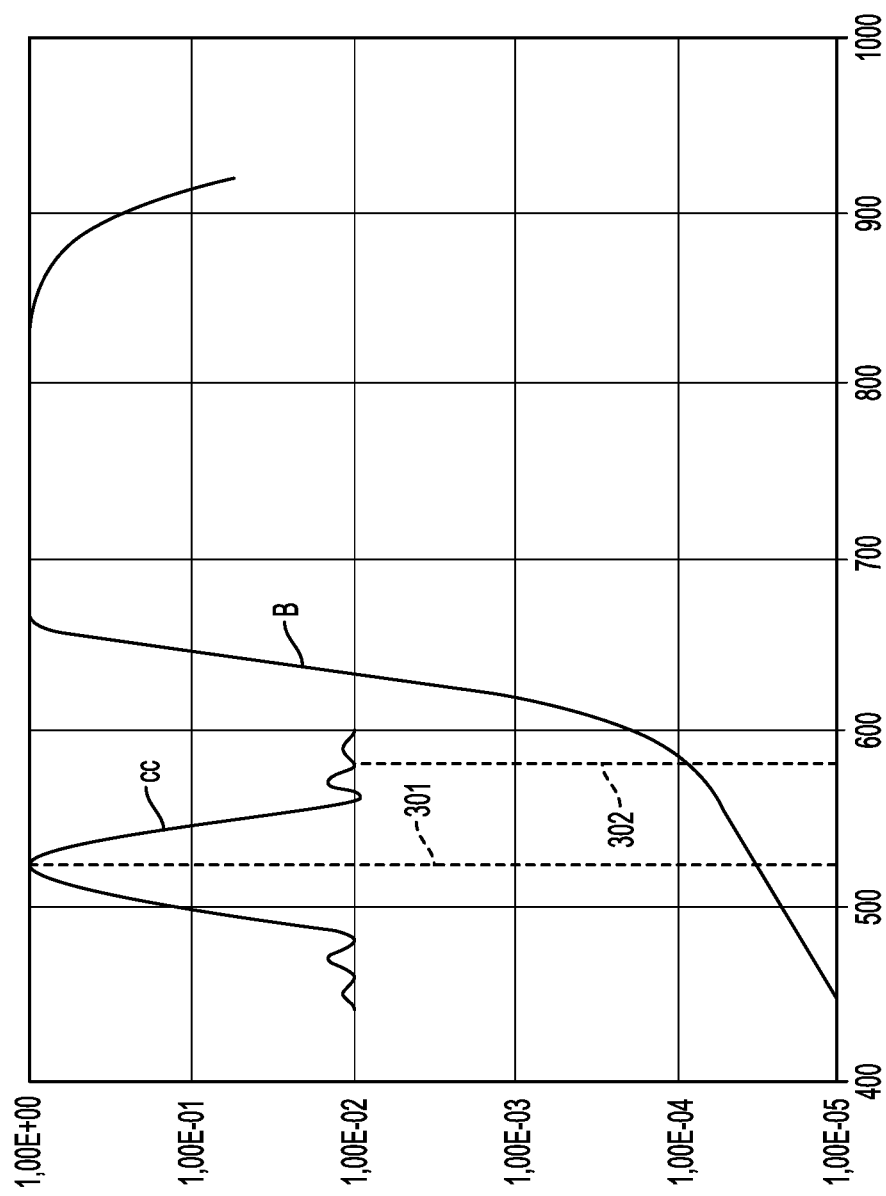
FIG. 3 shows a diagram of expected best mode for the invention of light sources emission wavelengths and combiner coating reflection spectrum, compared to night vision goggles class B image sensitivity.

It would maybe be possible to use a separate diode with longer wavelength, such as red light, also, but due to the steep curve of the NVIS class B sensitivity characteristic in the wavelength interval 600 to 660 nanometres it is hard to find an acceptable level and to keep it stable. The sensitivity curve B in FIG. 3 is typical for an NVIS class B, but two individual goggles of that type may have an order of magnitude different sensitivity at for example 640 nanometres. This is not the case at the wavelengths considered for the invention; the sensitivity curve B in FIG. 3 is less steep at the devised yellow wavelengths.

The system may also be provided with a short pass filter 14 with a cut-off wavelength of approximately 610-620 nanometres in the ray path after the second light source but before the image generator. Such a filter is devised to reduce the transmission of light of longer wavelengths with a factor of at least 1000. The effect is that light of wavelengths risking saturating the image intensifier tubes of the night vision goggles 92 is heavily reduced.

A band pass filter may also be used to increase the number of types of alternate light producing devices. With such a filter it may be possible to use an incandescent lamp as a light producing device instead of a LED.

The daylight diode, i.e., the diode for use during daylight conditions, may preferably be a diode with a dominating wavelength of its emitted light of around 520-540 nanometres. In particular, the dominating wavelength of the daylight diode may be around 524 nanometres.

The nightlight diode may be a diode with a dominating wavelength of its emitted light of around 560-600 nanometres. In particular, the dominating wavelength of the nightlight diode may be around 580-590 nanometres.

Other suitable light source(s) is/are laser diode(s), if such may be available for the light wavelengths specified. Such diodes are devised to work well because they have Gaussian or approximately Gaussian distribution and smaller half intensity bandwidth than LEDs.

The spectrum of the nightlight light source and the reflection spectrum of the combiner coating is carefully arranged to each other with taking into consideration the amplification of the image by the night vision goggles class B such that nightlight light source light is of a spectrum having its peak intensity wavelength at a longer wavelength than a peak reflection wavelength of the refection spectrum, as disclosed above.

The function of shifting from using the light from daylight diode to using light from the nightlight diode may be achieved by arranging the diodes such that they can be shifted from a first position where the first diode (12) is close to the image generator, to a second position where the second diode (10) is close to the image generator (20). In an alternative the diodes may be arranged opposite each other and with a pivotal mirror arranged between them to mirror light 90 degrees to the side. When shifting, the pivotal mirror is turned 90 degrees to reflect light from the other diode. Corresponding diodes are turned on and off respectively.

A third way to achieve the shifting may be to let the night time diode light to be injected via an optical fibre or small mirror into a small part of the permanent light path and switch off the daylight diode and turn on the nightlight diode.

The nightlight diode is thus chosen with a wavelength that gives enough light through the combiner and does not affect the NVIS capability. Using shorter wavelength would not give enough light and a longer wavelength would impair the NVIS capability. The green daylight diode is chosen with a wavelength that gives optimum contrast for the eye when used towards most background colours encountered by a pilot and the coating of the combiner is preferably optimized for the daylight diode dominating wavelength to give maximum performance during bright day conditions.

The image generator display 20 may be of a transmitting type, for example a Liquid Crystal Display (LCD) as shown in FIG. 1, or may be of a reflecting type, for example a Digital Micro-mirror Device (DMD), with corresponding change of the light sources 10, 12 position.

The head-up display optics may comprise optical elements 30-70 in a compact way to combine light rays of the image from the image source with light rays 90 representing the outside terrain such that a combined image reaches an intended position of an observer's eyes 100. The optics may as an alternative be of some other arrangement as known by a person skilled in the art of head up displays.

The invention claimed is:

1. A head-up display system suitable for a vehicle having a pilot or observer liable to use night vision goggles of NVIS class B for looking at the environment and simultaneously at symbols of the head-up display during night vision conditions, the head-up display system comprising:
   an image source (20);
   a semi-transparent combiner mirror (70) having a coating (72);
   a first light source (12); and
   a second light source (10),
   wherein:
      the image source (20) is configured to project an image comprising symbols on the semi-transparent combiner mirror (70),
      the coating (72) is configured to superimpose the projected image onto a view of the environment in front of the vehicle by transmitting light rays (90) from the environment and at the same time reflecting the projected image towards an intended position of the eyes (100) of the observer,
      the two light sources (10, 12) are configured for alternatively providing light to the image source (20),
      the first light source (12) is configured to emit light of a first light emission spectrum to be used during daylight conditions,
      the second light source (10) is configured to emit light of a second light emission spectrum to be used during night vision conditions,
      the second light emission spectrum corresponds to a light colour that is at least one of mainly yellow or mainly orange,
      the light emission spectrum of the first light source (12) has a wavelength of peak intensity in the range of 520-540 nanometers, and a bandwidth that is limited,
      the light emission spectrum of the second light source (10) has a wavelength of peak intensity in the range of 570-600 nanometers, and a bandwidth that is limited,
      the coating (72) of the semi-transparent combiner mirror (70) has a combiner coating reflection spectrum having a peak of reflection at a wavelength within the range of 510 to 540 nanometers corresponding to a maximum reflection of light waves from the first light source (12),
      light from the second light source (10), when reaching the position of the pilot's night vision goggles or unaided eye, after having travelled from the second light source (10) via the image source and via the semi-transparent combiner mirror (70), has a luminance that, after intensification in night vision goggles class B, matches the intensified luminance of light of 670-930 nanometer,
      during daylight condition, the coating (72) of the semi-transparent combiner mirror (70) is adjusted to the wavelength of the first light source (12), such that light from the first light source (12) is reflected efficiently to provide good contrast to a pilot's eye also without any vision aids, and
      during night vision conditions, the coating (72) of the semi-transparent combiner mirror (70) is adjusted to the wavelength of the second light source (10), such that light from the second light source (10) is reflected to provide light of the emission spectrum of the second light source suitable to be intensified by night vision goggles of NVIS class B to produce symbols of similar luminance as the image of the environment in light of 670-930 nanometer wavelength (red and infrared).

2. The head-up display system of claim 1, wherein the light emission spectrum of the first light source (12) is of approximately Gaussian shape.

3. The head-up display system of claim 1, wherein the light emission spectrum of the second light source is of approximately Gaussian shape.

4. The head-up display system of claim 1, wherein the light emission spectrum of the first light source (12) has a peak at least one of at or near 524 nanometers.

5. The head-up display system of claim 1, wherein the combiner coating reflection spectrum has a peak of reflection at least one of at or near 524 nanometers.

6. The head-up display system of claim 1, wherein:
   a semi-transparent flat folding mirror (60) is arranged between the intended position (100) of the eyes of the observer; and
   the semi-transparent combiner mirror (70) is configured for reflecting the image from the image source (20) towards the semi-transparent combiner mirror (70).

7. The head-up display system of claim 6, wherein the semi-transparent combiner mirror (70) is at least one of spherical or aspherical.

8. The head-up display system of claim 6, wherein the semi-transparent combiner mirror (70) is spherical.

9. The head-up display system of claim 1, wherein the emission dominating wavelengths and the combiner mirror reflection spectrum have the principal appearance as depicted in FIG. 3, curve 301, curve 302 and curve CC.

10. The head-up display system of claim 1, wherein the combiner mirror reflection spectrum is of approximately Gaussian shape.

11. Use of the head-up display system claim 1 together with night vision goggles (92) of NVIS class B.

* * * * *